United States Patent [19]

Linteau

[11] Patent Number: 5,328,276
[45] Date of Patent: Jul. 12, 1994

[54] BEARING MOUNTING FOR SHAFTS

[76] Inventor: Michel Linteau, 674 Lauzon, Ste-Dorothée, Laval, Québec, Canada, H7X 2X1

[21] Appl. No.: 974,507
[22] Filed: Nov. 12, 1992
[51] Int. Cl.⁵ ............... F16C 33/72; F16C 33/76; F16C 23/08
[52] U.S. Cl. .................. 384/477; 384/484; 384/489; 384/495
[58] Field of Search ............... 384/477, 481, 482, 484, 384/486, 489, 495, 498

[56] References Cited

U.S. PATENT DOCUMENTS

| | | | |
|---|---|---|---|
| 2,512,148 | 6/1950 | Gaines | 384/489 |
| 2,743,971 | 5/1956 | Kramcsak, Jr. | 384/489 |
| 2,757,054 | 7/1956 | Van De Warker | 384/908 X |
| 2,983,529 | 5/1961 | Price | 384/477 X |
| 3,166,362 | 1/1965 | Slaght | 384/582 |
| 3,460,874 | 8/1969 | Johnson | 384/489 |
| 3,656,824 | 4/1972 | Ullberg | 384/482 |
| 3,873,167 | 3/1975 | Anderson | 384/908 X |
| 4,054,335 | 10/1977 | Timmer | 384/489 X |
| 4,076,347 | 2/1978 | Meek | 384/908 X |
| 4,489,992 | 12/1984 | Brandenstein et al. | 384/496 |
| 4,718,780 | 1/1988 | Trudeau | 384/206 |
| 4,875,786 | 10/1989 | DeWachter | 384/477 X |

FOREIGN PATENT DOCUMENTS 3336398  4/1985  Fed. Rep. of Germany ...... 384/477

Primary Examiner—Thomas R. Hannon
Attorney, Agent, or Firm—Swabey, Ogilvy, Renault

[57] ABSTRACT

A bearing mounting for a shaft having a pillow block support with a through opening for the shaft and a bearing within the opening. A bearing sealing member is mounted on the support on each side of the bearing. Each bearing support sealing member is laterally spaced from the bearing to form an open chamber adjacent each side of the bearing.

14 Claims, 3 Drawing Sheets

BEARING MOUNTING FOR SHAFTS

BACKGROUND OF THE INVENTION (a) Field of the Invention

This invention is directed toward an improved bearing assembly for shafts.

The invention is more particularly directed toward an improved housing for bearing assembly for shafts.

(b) Description of Prior Art

Known bearing mountings for shafts employ seals that are usually an integral part of the bearing. The seals are mounted directly on the bearing structure. Any excess lubricant in the bearing leaks past the seals. Any contaminants around the bearing mounting that leak past the seal in the other direction immediately contact the bearing and can adversely affect its operation by contamination. Lubricant leakage from bearing mountings is normally not a problem. However when the bearing mountings are employed in food handling or food preparation environments, or similar environments where cleanliness is essential, or in environments where contaminants are present, lubricant leakage in bearing mountings is unacceptable.

The known bearing seals are also usually quite complicated in construction and mounting. Often the seals are composed of several elements.

SUMMARY OF INVENTION

It is the purpose of the present invention to provide an improved bearing housing that minimizes leakage of lubricants from the bearing, and entry of contaminants into the bearing, thus maximizing the life of the bearing. It is another purpose of the present invention to provide simple and easily installed bearing seals in a bearing housing. It is a further purpose of the present invention to provide an improved bearing housing suitable for use in clean and/or severe environments.

In accordance with the present invention there is provided an improved bearing housing having bearing seals which are independent of, and spaced laterally from the bearing. This lateral spacing of the seals provides a chamber adjacent each side of the bearing. Excess lubricant from the bearing will enter the chambers and this minimizes the chance of the lubricant passing by the seals since the lubricant is under no pressure in the chambers. The chambers also form a trap for contaminants which might get past the seals, thus minimizing the risk of the contaminants entering the bearing.

Also in accordance with the present invention, the bearing support seals are relatively simple in construction. The bearing support seals, in one embodiment, can comprise a single element. The bearing support seals are simply and easily installed. In one embodiment, one bearing support seal is press-fit mounted flush with the side of the bearing block allowing this side of the bearing block to be mounted flush with a wall or other member. At least one of the seals is mounted with fasteners so it can be easily removed permitting access to the bearing if needed.

The invention is particularly directed toward a bearing mounting for a shaft, the mounting having a support with a cylindrical opening through the support. A bearing is mounted on the support within the opening. A bearing support sealing member is provided on each side of the bearing. Each bearing sealing member is mounted on the support in a position spaced laterally from the bearing to provide an open chamber adjacent each side of the bearing. The bearing, and at least one of the bearing sealing members, have aligned openings for receiving the shaft.

BRIEF DESCRIPTION OF DRAWINGS

The invention will now be described in detail having reference to the accompanying drawings in which.

DESCRIPTION OF PREFERRED EMBODIMENTS

Figure 1:
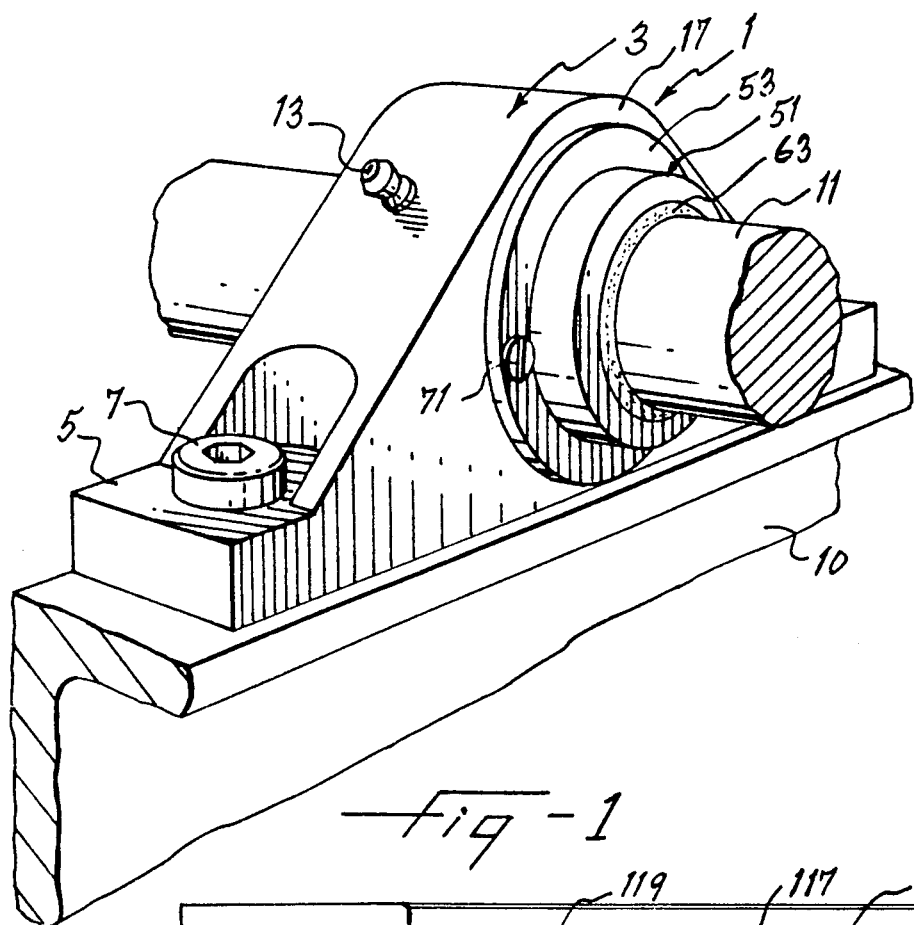
FIG. 1 is a perspective view showing the bearing mounting in a pillow block support.

The bearing mounting 1 of the present invention, as shown in FIGS. 1 to 6, has a support 3 in the form of a pillow block. The pillow block support 3 is adapted to be mounted at its ends 5, by bolts 7 to a base 10. The pillow block support 3 has a centrally located cylindrical opening 9 through which a shaft 11, to be rotatably supported by the bearing mounting 1, is passed. A lubricant fitting 13 is provided on the outside of the pillow block support 3, between its parallel side walls 15, 17. The lubricant fitting 13 communicates with the center of the opening 9 through passage means (not shown) as is well known. A cap plug lubricant fitting (not shown) is also included.

A ball bearing 21 is rotatably mounted within the opening 9 of the pillow block support 3. The ball bearing 21 has an inner race 23, an outer race 25 and balls 27 in between. While a ball bearing has been described, other types of bearings, such as roller bearings can be employed. The inner race 23 has a central opening 29 through which the shaft 11 snugly passes. The outer surface 31 of the outer race 25 is convex. A concave groove 33, matching the convex outer surface 31 of the outer race 25, is formed within the center of the cylindrical wall defining the opening 9 in the support 3. The formation of the groove 33 leaves narrow lips 35, 37 on each side of the groove.

Figures 5, 6:
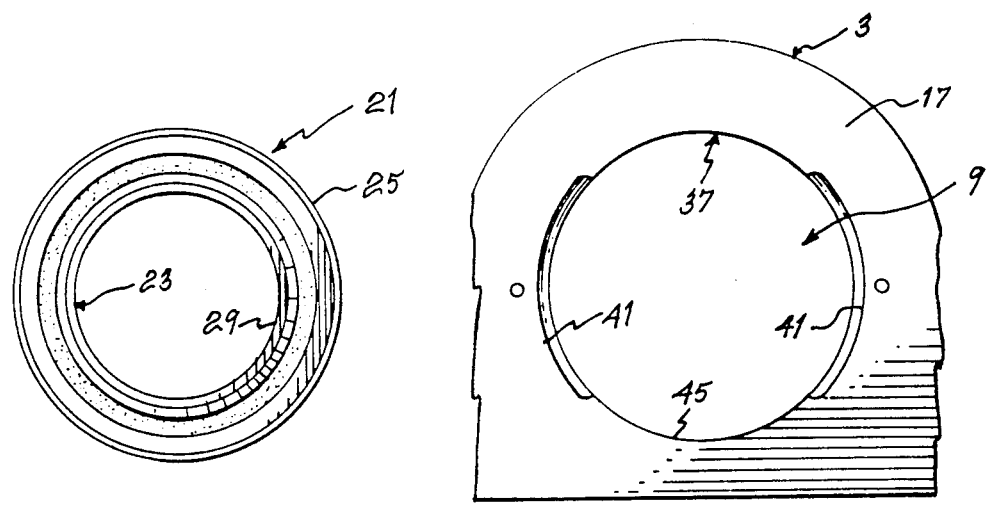
FIG. 5 is a side view of the bearing.
FIG. 6 is a detail side view of the pillow block support.

The ball bearing 21 is mounted within the groove 33. In order to mount the bearing 21 within the groove 33, the support 3 is provided with relief passages 41 in the lip 37 between the groove 33 and side wall 17 as shown in FIG. 6. When the bearing 21 is to be mounted in the support 3, it is positioned with its outer race 25 aligned vertically with relief passages 41. The bearing 21, in this position, can be pivoted laterally into the groove 33. In this position, the outer race 25 is aligned with groove 33 and is locked on its rotational axis.

The bearing mounting 1 includes cover sealing member 51, bearing support seal 54 and seal 63. The cover sealing member 51 on the one side 17 of the support is normally removably mounted to the support so that it can be removed if the bearing 21 needs replacing. The cover sealing member 51 has a flange 53 resting tightly against the side wall 17 and a first collar 55 projecting from one side of the flange 53 that is sized to fit snugly within the rim 37 of the support 3. The cover sealing member 51 has a second collar 57 that is slightly larger than the first collar 55, projecting from the other side of the flange 53. The outer end 59 of the second collar 57 has a counterbore 61. A seal 63 in the form of a ring-like insert is press-fit into the counterbore 61. The inner portion of the seal 63 has resilient sealing means. These means can comprise a resilient sealing flap 65 that seals tight against the shaft 11. The inner periphery of the flap 65 defines an opening 69 for the shaft. The use of the seal 63 permits material to be used that is suitable for proper sealing on the shaft. It is contemplated that the cover sealing member 51 can be made in one piece, if desired, of suitable sealing material. The cover sealing member 51 is mounted on the support 3 with its flange 53 tight against the side wall 17. Screws 71 detachably hold it in place. When mounted on the support 3, it will be seen that the sealing means 65 of the seal 63 is laterally spaced from the bearing 21 forming an open chamber 75 adjacent the side 77 of the bearing and the side 78 of the shaft.

The second bearing support seal 54 comprises an aperture disk 81 having a central opening 83 with resilient sealing means 85 in the opening 83. The resilient sealing means 85 comprises a resilient flap 87 formed in the disk 81 and defining the opening 83. A counterbore 91 is formed in the sidewall 15 of the support 3 concentric about opening 9. The counterbore 91 is sized so that the disk 81 can be tightly press-fit into it and lie flush with the sidewall 15. The bearing support seal 54 is not normally removed as is the cover sealing member 51. It will be seen that the bearing support seal 54 is also laterally spaced from the bearing 21 forming an open chamber 95 adjacent the other side 97 of the bearing.

The shaft 11 is mounted through the aligned openings 29, 69, and 83 in the bearing 21 and the cover sealing member 51, bearing support seal 54 and seal 63. The cover sealing member 51, seal 63 and bearing support seal 54 prevent any dirt or other contaminants from reaching the bearing 21. Even if dirt did get past the cover sealing member 51, seal 63 and bearing support seal 54 it would have to traverse the chambers 75, 95 before affecting the bearing 21. The chambers 75, 95 also receive any excess lubricant from the bearing 21. The lubricant is not as likely to leak past the cover sealing member 51, seal 63 and bearing support seal 54 because of the overflow space provided by the chambers 75, 95 and because the lubricant is not under pressure in these chambers. This is important when the bearing mounting is used in a clean environment.

The support 3, and the cover sealing member 51, are preferably made from a plastic material that is resistant to chemical agents encountered for example in the food industry or the like. The plastic material will not rust, and absorbs stresses well, such as those that might be set up with an uneven mounting of the support 3. Suitable plastic materials are ultra high molecular weight polyethylene, and the like. Seal 63 and bearing support seal 54 are preferably made of Aramid ™ fiber reinforced composite or other applicable synthetic material that will resist chemical agents.

Figures 3, 7:
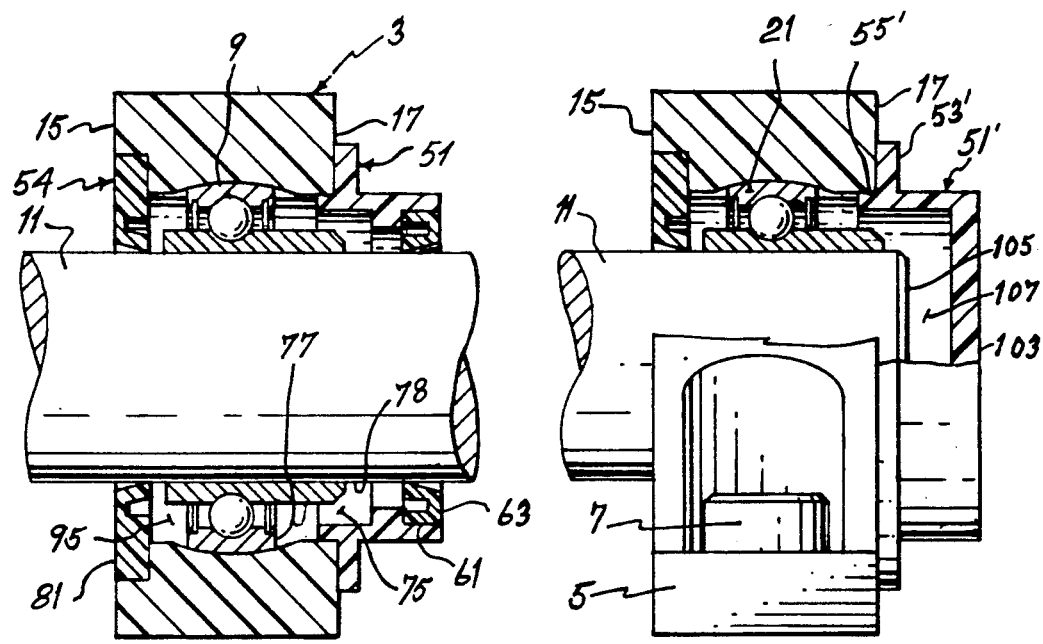
FIG. 3 is a cross-section view taken along line 3—3 in FIG. 2.
FIG. 7 is a view similar to FIG. 3 of another embodiment of the invention.
Figure 4:
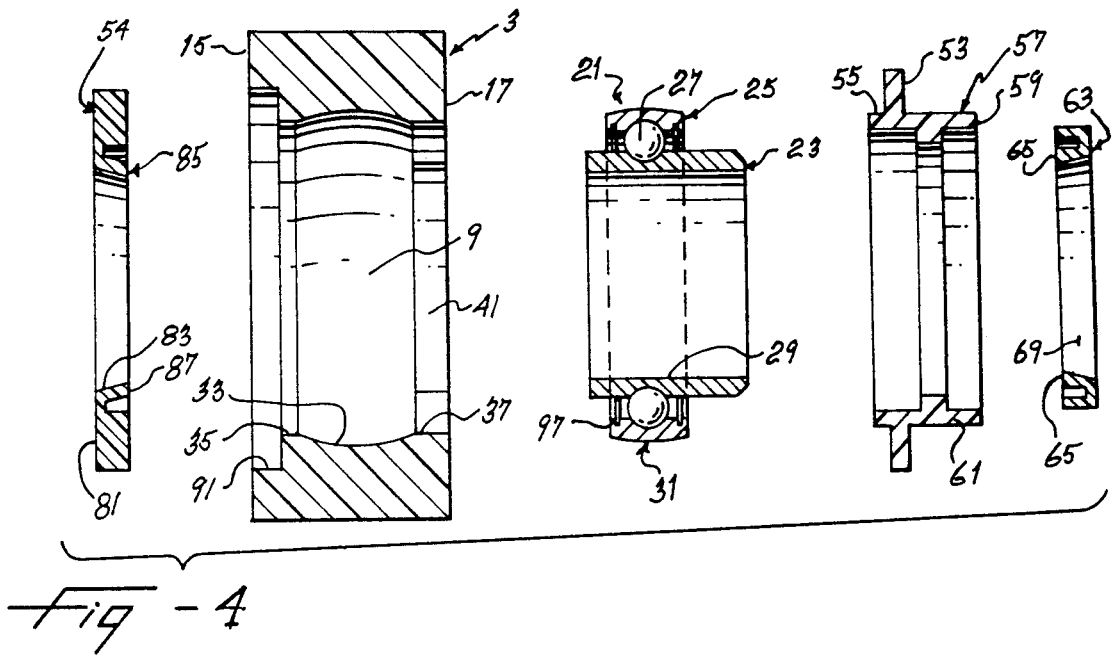
FIG. 4 is an exploded view of the elements shown in FIG. 3 but without the shaft.

In another embodiment of the invention shown in FIG. 7, the cover sealing member 51 can be modified to have the bearing mounting accommodate a shaft that terminates at the bearing mounting instead of passing through it as shown in FIG. 1. The modified cover bearing sealing member 51' as shown in FIG. 7 has a flange 53' resting tightly against the sidewall 17 of the support 3 and a first collar 55' projecting from one side of the flange 53'. The first collar 55' fits snugly within the rim 37 of the support 3. The cover bearing sealing member 51' has an end cap 103 projecting from the other side of the flange 53'. The integral end cap 103 closes off the outside of the cover bearing sealing member 51'. When the cover sealing member 51' is mounted on the sidewall 17 of the support 3 with screws, it closes the opening 9 on this side. The end 105 of the shaft 11 is spaced from the cap 103 forming a chamber 107 adjacent the bearing 21. The modified cover sealing member 51' closes off the bearing 21 to contaminants while at the same time providing room for excess lubricant from the bearing 21. The remainder of the bearing mounting construction is the same as that in FIGS. 1 to 6.

Figure 8:
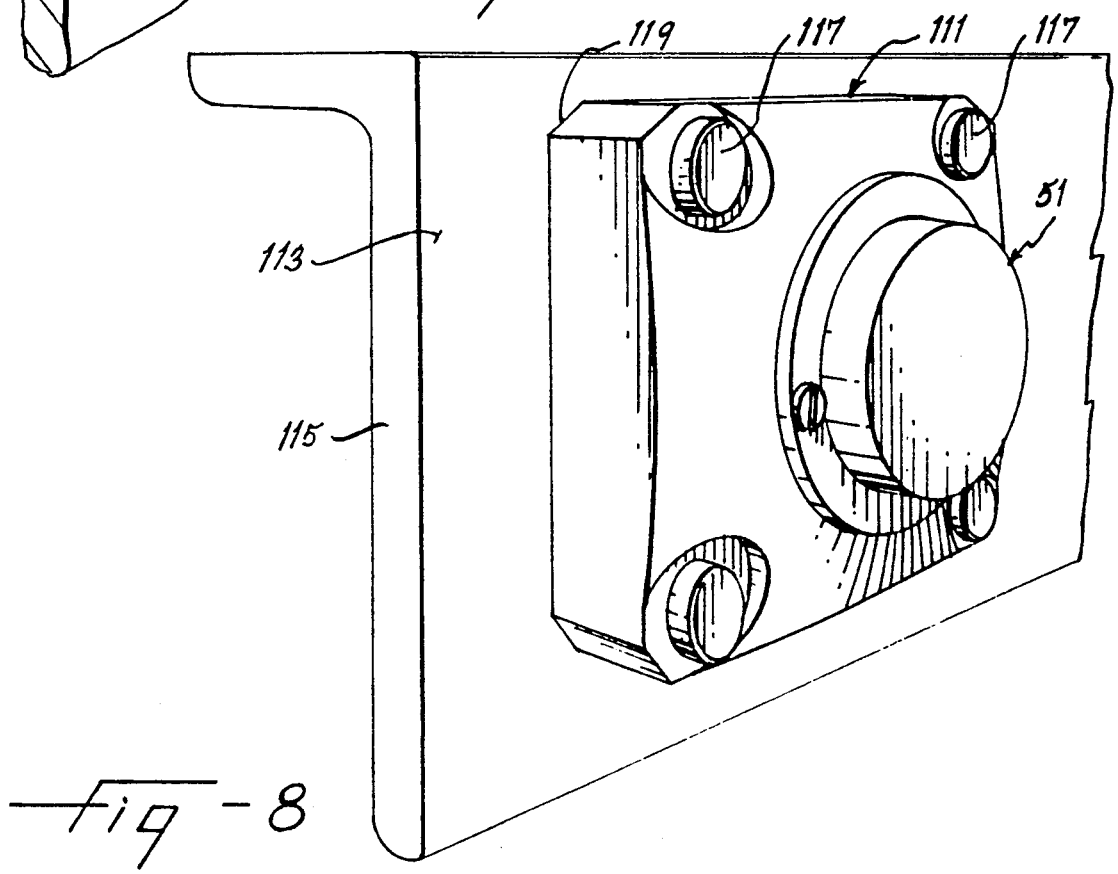
FIG. 8 is a perspective view showing the bearing mounting in an end block support.
Figure 2:
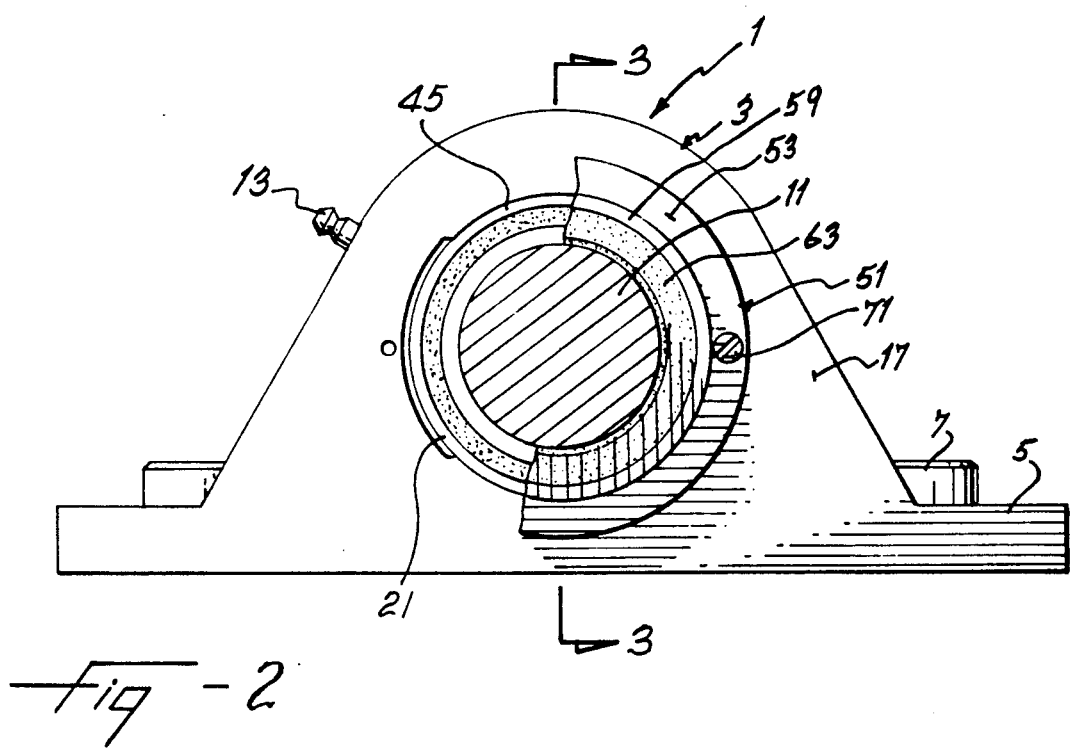
FIG. 2 is a side view of the pillow block support with a portion of the detachable bearing sealing cover broken away.

While the bearing mounting has been shown in a pillow block support, it can also be employed in an end block support (flange type) as shown in FIG. 8. The end block 111 is mounted to the side 113 of a beam 115, or to any other form of base, by bolts 117 located at the corners 119 of the block. The bearing (not shown) is mounted in the end block 111 in the same manner as it is in the pillow block. The sealing member on the side of the end block 111 flat against the side 113 of the beam 115 is the same as the bearing support sealing 54 used in the pillow block. Either cover bearing sealing member 51, 51' can be used on the other side of the end block depending on whether the shaft extends through the end block, or terminates at the end block. Cover bearing sealing member 51' is shown as being used in FIG. 8. Other types of supports for the shaft and bearing can be employed.

I claim:

1. A self aligning sealed bearing assembly for a rotating shaft, including a housing made of synthetic resin, consisting of a one piece bearing support member and at least one removable seal cover and at least one non-metallic seal, the bearing support member including mounting means for mounting the housing to a supporting surface, the bearing support member having a cavity for receiving an outer race of a bearing insert, a bore defined in the bearing support member concentric with the cavity in the bearing housing and extending through the support member from one side face to the other side face to accommodate the rotating shaft, the side faces being parallel, the at least one removable seal cover being mounted to one of the side faces and defining a closed sealed chamber adjacent the bearing insert from the one of the side faces and means including said at least one non-metallic seal on at least the other side face to completely seal the bearing assembly.

2. A bearing assembly as claimed in claim 1, wherein the at least one removable seal cover includes an opening and a further non-metallic seal about the opening concentric with the shaft and to bear there against while means including said at least one non-metallic seal is included on the other side face.

3. A bearing assembly as claimed in claim 1, wherein a removable seal cover is mounted to each side face and each cover has aligned openings for receiving the shaft, while each cover mounts a non-metallic seal about the respective opening to bear against the shaft.

4. A bearing assembly as claimed in claim 1, wherein seal covers are provided on both side faces of the support to allow for removal of the bearing.

5. A seal assembly as defined in claim 1, wherein the housing is made up of ultra high molecular weight polyethylene.

6. A bearing assembly as claimed in claim 1, wherein the other side face is planar, and a counterbore is defined in the other side face concentric with the bore in the support member, the at least one non metallic seal is mounted to the counterbore and is flush with the other side face of the support member.

7. A bearing assembly as defined in claim 6, wherein the other side face is mounted to a matching planar surface of a frame to receive the shaft and the support member is bolted to the frame.

8. A self aligning seal bearing assembly as defined in claim 1, wherein the at least one seal cover includes an integral end cap with a flange mounted at the one side face for use with a bearing assembly to which the shaft end terminates at the bearing and is spaced from the end cap.

9. A bearing assembly as defined in claim 8, wherein a further removable seal cover is provided on the other side face which is annular and defines an opening for receiving the shaft, said annular seal cover includes said at least one non-metallic seal, in sealing contact with the rotating shaft.

10. A bearing assembly as defined in claim 1, wherein said at least one removable seal cover is annular and is provided on the one side face, another non-metallic seal is fixed to said at least one removable seal cover and is in sealing contact with the rotating shaft, and a further annular seal cover is mounted to the other side face and said at least one non-metallic annular seal is fixed to the second seal cover and is in sealing contact with the rotating shaft, whereby the shaft extends through the bearing assembly.

11. A seal assembly as defined in claims 9 or 10, wherein the non-metallic seals are made of Aramid TM fiber reinforced composite.

12. A seal assembly as defined in claims 9 or 10, wherein the non-metallic seals include an inwardly extending flap in sealing contact with the shaft.

13. A bearing assembly as defined in claim 10, wherein the bearing support member is in the form of a pillow block to be mounted on a frame, and the housing is made of ultra high molecular weight polyethylene.

14. A bearing assembly as defined in claim 8, wherein the other side face is a flat planar surface adapted to be mounted to a matching planar surface of a frame to receive the end of a shaft, and the housing is made of ultra high molecular weight polyethylene and the support member is bolted to the frame.

* * * * *